Sept. 29, 1970  J. W. DUCKETT ET AL  3,531,157

SEAT CONSTRUCTION

Filed Aug. 23, 1968  2 Sheets-Sheet 1

INVENTORS
JOHN W. DUCKETT
PAUL W. POEHLMANN
BY GEORGE E. SCOTT

ATTORNEYS

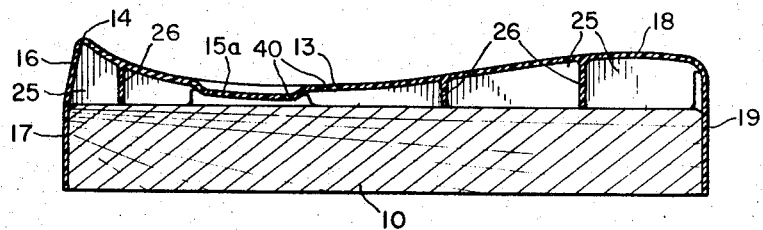
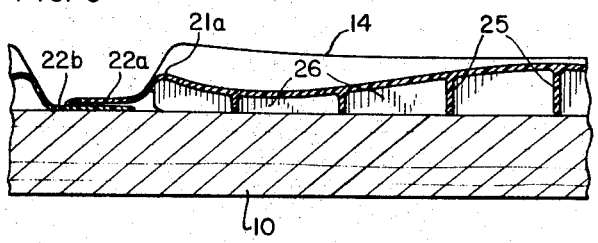
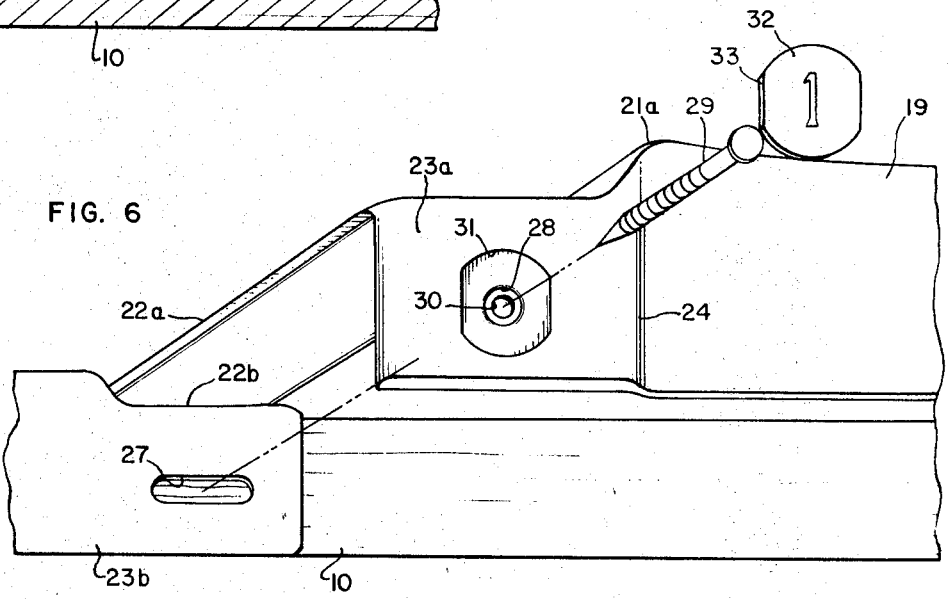
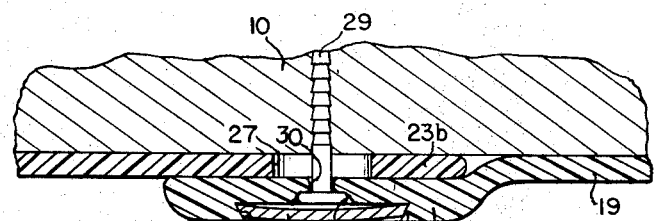
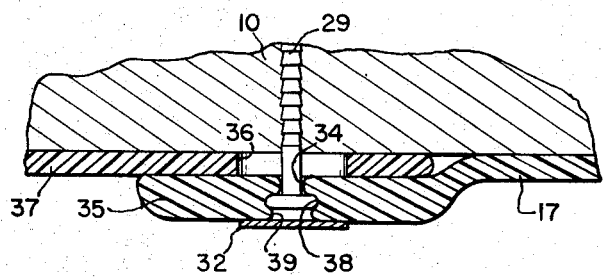
INVENTORS
JOHN W. DUCKETT
PAUL W. POEHLMAN
BY GEORGE E. SCOTT
ATTORNEYS

United States Patent Office 3,531,157
Patented Sept. 29, 1970

3,531,157
SEAT CONSTRUCTION
John W. Duckett, Tiburon, Paul W. Poehlmann, San Anselmo, and George E. Scott, San Francisco, Calif., assignors to Composite Structures Incorporated, Sausalito, Calif., a corporation of California
Filed Aug. 23, 1968, Ser. No. 754,857
Int. Cl. A47c 1/16
U.S. Cl. 297—248                                    18 Claims

ABSTRACT OF THE DISCLOSURE

A plurality of plastic seats are secured in overlapping relationship on a wooden bench or the like to form a multiple seating arrangement. Each seat is contoured to afford high structural integrity thereto and to provide end portions which snugly nest with overlapping end portions of adjacent seats. Fastening means project through such overlapping end portions and are secured to the bench.

---

Conventional seats, oftentimes exhibit structural failures due to the inherent frailty thereof. Such structural failures are particularly apparent with respect to seats which are constantly subjected to rough usage. For example, the numerous seats employed in a sport's stadium are subjected to considerable usage and periodic vandalism. When such seats are employed outside, environmental conditions such as rain tend to further decrease the seat's longevity. Repair or replacement of such seats involves considerable expense.

An object of this invention is to overcome problems such as those briefly described above by providing a seat construction which exhibits a high degree of structural integrity and is constructed for ultimate comfort. In addition, the individual seats are constructed and arranged to be coupled together to form a multiple seating arrangement and to further increase the structural integrity and longevity thereof. Another novel aspect of this invention comprises the use of uniquely arranged fastening means for preventing easy removal of the seats and for also allowing the seats to freely expand and contract when they are subjected to adverse temperature variations.

Other objects of this invention will become apparent from the following description and accompanying drawings wherein.

Figure 1:
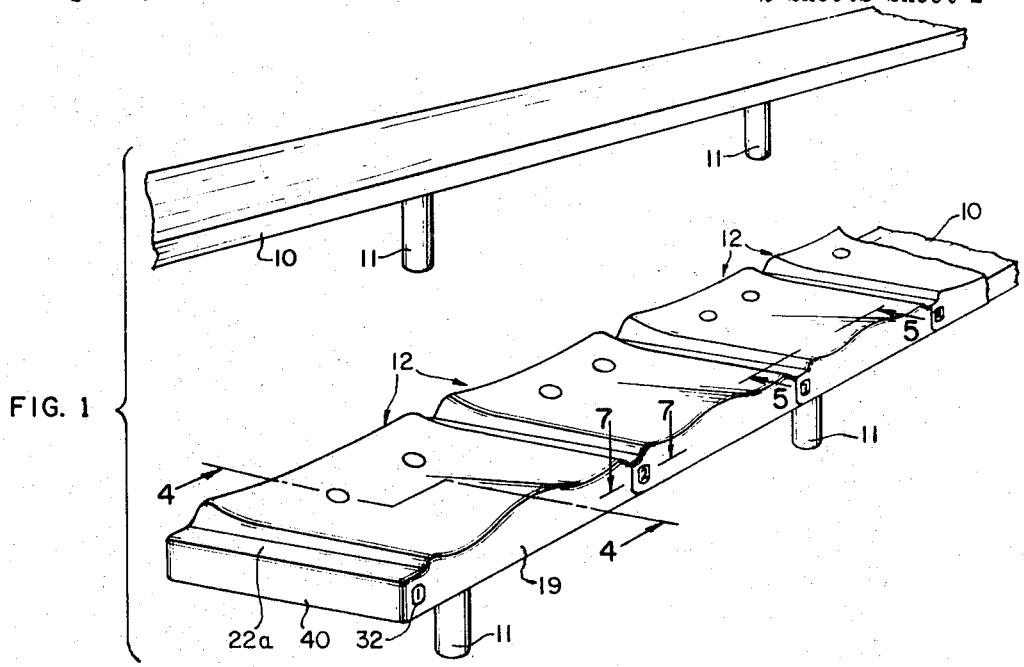
FIG. 1 is an isometric view illustrating a plurality of seats of this invention coupled together on a conventional wooden bench to form a multiple seating arrangement.

FIGS. 4 and 5 are sectional views taken in the direction of arrows 4—4 and 5—5, respectively, in FIG. 1;

FIG. 6 is an exploded view illustrating means for securing two adjacent seats to a wooden bench;

FIG. 7 is a sectional view taken in the direction of arrows 7—7 in FIG. 1; and

Figure 2:
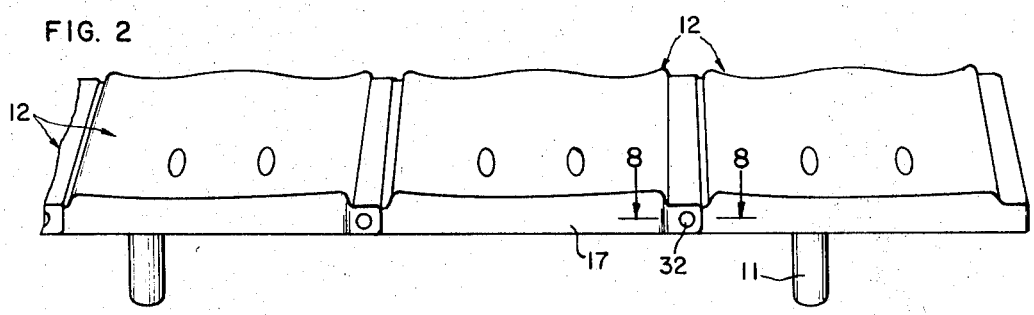
FIG. 2 is a rear, isometric view of such seats.
Figure 3:
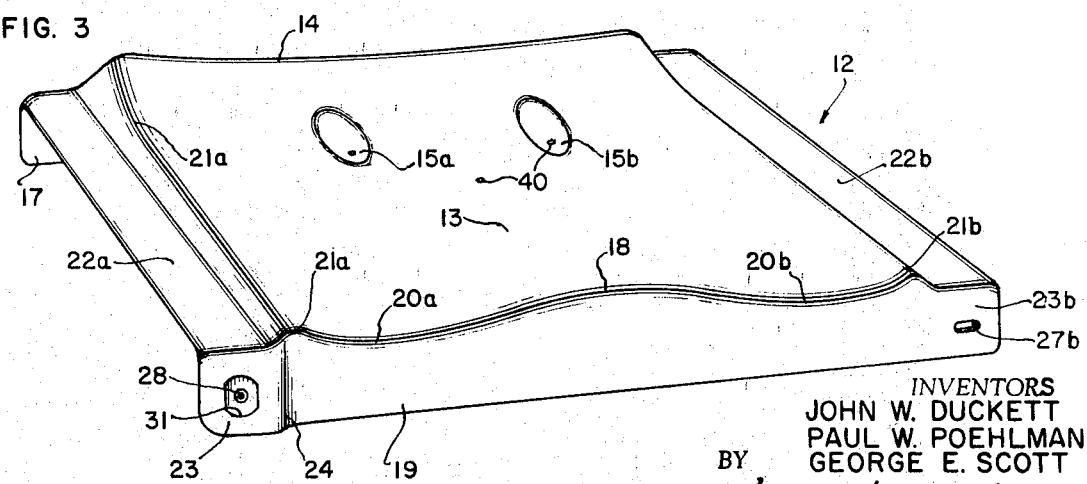
FIG. 3 is an isometric view illustrating the preferred seat embodiment.

FIG. 8 is a sectional view taken in the direction of arrows 8—8 in FIG. 2.

FIG. 1 illustrates a multiple seating arrangement employing the seats of this invention therein. In particular, a conventional wooden bench 10, such as those normally employed in a sport's stadium, is supported by a plurality of spaced columns 11 secured to a concrete foundation or the like. A plurality of seats 12 are secured to the top, front and rear sides of the bench to increase the structural integrity and longevity thereof. In addition, such seats prevent a person from encountering splinters or the like from the bench directly and comprise an expedient method recovering such bench.

The preferred seat construction, clearly illustrated in FIGS. 2–5 may constitute a high-strength and semi-rigid plastic material which may be vacuum formed, injection molded or formed pursuant to other suitable techniques. The horizontally disposed seat is preferably substantially symmetrical except for a few variances hereinafter described. The substantially hollow seat comprises a centrally disposed concave portion 13 gradually terminating at its backside at a rear ridge portion 14 of substantially constant cross section throughout its length. Spaced oval cavities or depressions 15a and 15b are preferably formed at the up-slope of surface 13 and in alignment with ridge portion 14 to provide receptacles for a person's ischial tuberosity bones.

In particular, when a seated attitude is maintained by a person for a long period of time fatigue and general discomfort are greatly reduced by such depressions. The bulk of the body weight is thus carried on the fatty or muscular tissues of a person's buttocks as opposed to a sitting force which is normally encountered by the ischial bones should one sit directly on bench 10, for example. In addition, the depressions increase the seat's structural integrity and aid in preventing warpage thereof.

A rear flange connected to ridge portion 14 comprises a sloped portion 16 and a vertically disposed portion 17 (FIG. 4) adapted to be secured directly to bench 10 in a manner hereinafter described. Concave portion 13 gradually terminates at its front side in a front ridge portion 18 connected to a vertically disposed front flange 19. Flange 19 is also adapted to be secured directly to bench 10 as will be hereinafter described. The central or hump portion of ridge portion 18 cooperates with surface 13 to form depressions 20a and 20b on each side thereof adapted to receive and retain the thighs of a person therein.

The latter depressions terminate at raised first and second side ridge portions 21a and 21b, respectively, which extend rearwardly and upwardly to join with the ends of ridge portion 14. From the above description it can be seen that concave central portion is substantially bounded on all sides by and gradually joined with the intersecting rear, front and side ridge portions. Such a construction affords the seat with a high degree of structural integrity to resist warpage, cracking and the like. In addition, such construction provides a comfortable composite contour for seating purposes.

Referring again to FIG. 3, side ridge portions 21a and 21b slope downwardly and outwardly to join with horizontally disposed flanges 22a and 22b, respectively. In the preferred embodiment flange 22a is disposed slightly higher than flange 22b to facilitate the nesting relationship between two adjacent and attached seats as will be hereinafter more fully described. Flange 19 is joined to flanges 22a and 22b by flange portions 23a and 23b, respectively. Portion 23a is preferably bent out of the plane of flange 19 at bend 24 (FIG. 7) to further facilitate such nesting relationship.

If so desired, a plurality of spaced ribs 25 (FIGS. 4 and 5) may be formed on the underside of the seat to increase the structural integrity thereof and to aid in preventing warpage or distortion of the above-described contours. In addition, such ribs are preferably arranged to provide bearing contacts as between bench 10 and the seat when weight is imposed upon the seat. Additional ribs 26 may be selectively formed in a like manner and arranged perpendicularly relative to ribs 25. However, it should be understood that such rib means could be disposed at angles other than the perpendicular and parallel dispositions illustrated.

Referring to FIGS. 6 and 7, front flange portion 23b has an elongated aperture or slot 27 formed therethrough adapted to be aligned with an aperture 28 formed in front flange portion 23a of an adjacent seat. Thus a threaded or serrated nail 29 or other suitable securing means may be inserted through the apertures and secured to bench 10 to positively retain the adjacent and overlapping seats in position. The elongated slot provides a suitable manufacturing tolerance to assure correct alignment and will permit limited thermal expansion of the seats when they are subjected to varying temperatures.

Aperture 28 is formed to seat the nail's head therein and is preferably defined in part by an annular bead 30 having a diameter equal to or slightly less than the diameter of the nail's shank. The plastic bead is sufficiently resilient to receive the nail and to aid in preventing lateral or axial movements thereof. Flange portion 23a may comprise an enlarged and substantially frusto-conically shaped recess 31 having converging side walls forming a flexible and resilient lip. The lips firmly retain an indicia means preferably comprising a plastic or metal insert 32 therein which may be snapped into place to indicate a seat number or the like by means of indicia 33 (FIG. 6).

The sides of the insert may be relieved at 33 if so desired to prevent the insert from rotating in the recess. The recess could be formed accordingly. Alternatively, the insert and recess could constitute mating square, truncated parabolic or other suitable configurations. Also, recess 31 could be eliminated and the insert could be adhesively secured directly to outer surface portions of the flange (FIG. 8) or to a top surface portion of the seat.

FIG. 8 discloses an alternative fastening arrangement for attaching overlying rear flange portions of the seats together. Serrated nail 29 projects through an aperture, defined in part by bead 34 similar to bead 30 in FIG. 7, formed in a portion 35 of flange 17. The nail further projects through an elongated slot 36 formed in an underlying portion 37 of flange 17 of an adjacent seat to attach the two seats to bench 10. The aperture further comprises an annular groove 38 terminating outwardly at a resilient bead 39. Thus when the nail is secured in place resilient bead 39 will snap-back to positively lock the head of the nail in groove 38.

It should be noted that each end seat further comprises an additional side flange 40. The flange is vertically disposed and connected to the outer edge of horizontal side flange 22a to cover the left side edge of the bench. A similar flange (not shown) would be connected to a second side flange 22b to cover the right side edge of the bench. Weep holes 40 may be formed through the seat at selected locations, such as those illustrated in FIGS. 3 and 4, to prevent water accumulation thereon.

What is claimed is:

1. A horizontally disposed seat comprising a concave central portion substantially bounded by and gradually joined with substantially straight and intersecting front, rear and first and second side ridge portions, all of said ridge portions disposed above said concave central portion to afford the seat a high degree of structural integrity and a comfortable composite contour for seating purposes, said seat being substantially hollow and further comprising substantially vertically disposed front and rear flanges extending downwardly from said front and rear ridge portions, respectively, and below said central portion, at least one of said front and rear flanges having means forming first and second horizontally aligned apertures through first and second opposite end portions thereof, respectively, said first end portion extending horizontally outwardly beyond said first side ridge portion and said second end portion extending horizontally outwardly beyond said second side ridge portion whereby two of said seats may be attached together by superimposing a first aperture of one seat over a second aperture of a second seat and by inserting a fastening means through said first and second apertures.

2. The invention of claim 1 wherein said rear ridge portion has a substantially constant cross-section throughout the length thereof.

3. The invention of claim 1 wherein said front ridge portion comprises a centrally disposed hump portion joined with depressions formed on each side thereof adapted to retain a person's thighs therein.

4. The invention of claim 1 wherein said seat further comprises spaced depressions adapted to receive a person's ischial tuberosity bones formed in said central portion whereat said central portion joins with said rear ridge portion and aligned with each other in the direction of said rear ridge portion.

5. The invention of claim 1 wherein said seat comprises a semirigid plastic material having a substantially constant thickness throughout.

6. The invention of claim 1 further comprising a substantially vertically disposed side flange connected to said front and rear flanges and to one of said first and second side ridge portions.

7. The invention of claim 1 wherein said seat further comprises substantially horizontally disposed first and second side flanges joined to and extending outwardly from said first and second side ridge portions, respectively, whereby when two of said seats are attached together a first side flange of one of said seats may be superimposed over a second side flange of a second seat.

8. The invention of claim 7 wherein one of said first and second side flanges is disposed vertically below the other of said side flanges to facilitate attaching two of said seats together.

9. The invention of claim 1 wherein said first end portion is bent horizontally outwardly from the plane of one of said front and rear flanges and said second end portion to facilitate nesting and overlapping of a first end portion of one seat with a second end portion of a second seat when two seats are attached together.

10. The invention of claim 1 wherein one of said apertures constitutes a substantially horizontally disposed elongated slot.

11. The invention of claim 1 further comprising indicia means attached to said seat for identification purposes.

12. The invention of claim 1 wherein said seat further comprises means forming a recess having converging side walls, said indicia means comprising an insert disposed in said recess and mechanically retained therein by said converging side walls.

13. The invention of claim 1 further comprising a horizontally disposed bench having a substantially flat top surface joined by vertically disposed front and rear surfaces and wherein at least two of said seats are mounted on said bench to cover the top, front and rear surfaces thereof and fastening means for attaching said seats to at least one of the front and rear sides of said bench.

14. The invention of claim 13 wherein said seats each comprise a semirigid plastic material.

15. The invention of claim 13 wherein each of said seats comprises first and second substantially horizontally disposed flanges joined to and extending outwardly from said first and second side ridge portions, respectively, a first side flange of one seat disposed in overlapping relationship with respect to a second side flange of the other of said seats.

16. The invention of claim 15 wherein said substantially vertically disposed front and rear flanges extend downwardly from said front and rear ridge portions, respectively, and below said central portion to substantially cover the front and rear surfaces of said bench, respectively, said fastening means projecting through at least one pair of said front and rear flanges and attached to said bench.

17. A seating arrangement comprising a horizontally disposed bench having a substantially flat top surface joined by vertically disposed front and rear surfaces, at least two substantially hollow seats mounted on said bench to cover the top surface thereof and having overlapping first and second horizontally disposed flange portions, respectively, each of said seats further having vertically disposed front and rear flanges substantially covering the front and rear surfaces of said bench, respectively, said front and rear pairs of flanges of said seats disposed in overlapping relationship, and fastening means projecting through at least one pair of said front and rear flanges and attached to said bench.

18. The invention of claim 17 wherein each of said seats comprises a concave central portion substantially bounded by and gradually joined with substantially straight and intersecting front, rear and first and second side ridge portions, all of said ridge portions disposed above said concave central portion, said first and second side ridge portions connected directly to said first and second horizontally disposed flanges, respectively, and said front and rear ridge portions connected directly to said vertically disposed front and rear flanges, respectively.

References Cited

UNITED STATES PATENTS

| | | | |
|---|---|---|---|
| 1,237,850 | 8/1917 | Wills | 297—249 |
| 2,970,638 | 2/1961 | Halter | 297—458 |
| 3,101,218 | 8/1963 | Baermann | 297—248 |
| 3,111,344 | 11/1963 | Hoven | 297—248 |
| 3,114,575 | 12/1963 | Eames | 297—458 |
| 3,298,045 | 1/1967 | Anderson | 297—219 X |
| 3,397,011 | 8/1968 | Sklaar | 297—219 |
| 3,466,087 | 9/1969 | Mofter | 297—232 |

FRANCIS K. ZUGEL, Primary Examiner

U.S. Cl. X.R.

297—219, 459